(12) United States Patent
Kobayashi et al.

(10) Patent No.: US 8,007,054 B2
(45) Date of Patent: Aug. 30, 2011

(54) VEHICLE BRAKE HYDRAULIC PRESSURE CONTROL APPARATUS

(75) Inventors: Masashi Kobayashi, Nagano (JP);
Tetsuhiro Narita, Nagano (JP);
Tomonori Hirose, Nagano (JP);
Tomoaki Sekiya, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 534 days.

(21) Appl. No.: 12/172,685

(22) Filed: Jul. 14, 2008

(65) Prior Publication Data

US 2009/0021072 A1   Jan. 22, 2009

(30) Foreign Application Priority Data

Jul. 18, 2007   (JP) ............................. P. 2007-187672

(51) Int. Cl.
*B60T 8/36* (2006.01)
(52) U.S. Cl. ............................. 303/119.1; 303/3; 303/155
(58) Field of Classification Search ............... 303/119.1, 303/3, 155, 156–158, 161, 162, DIG. 1, DIG. 2
See application file for complete search history.

(56) References Cited

U.S. PATENT DOCUMENTS

| 7,530,648 B2 * | 5/2009 | Obai ........................... 303/119.1 |
| 2005/0225164 A1 | 10/2005 | Obai |
| 2008/0001475 A1 * | 1/2008 | Kito et al. ..................... 303/155 |
| 2009/0025383 A1 * | 1/2009 | Kurosaki et al. ................ 60/545 |

FOREIGN PATENT DOCUMENTS

| EP | 0 526 839 | 7/1992 |
| JP | 6064518 | 3/1994 |
| JP | 9-240451 | 9/1997 |
| JP | 2000-62603 | 2/2000 |
| JP | 2003-19952 | 1/2003 |

OTHER PUBLICATIONS

Extended Search Report for corresponding European Application No. 08012910.9-2423, dated Sep. 27, 2010.
Office Action for Corresponding Japanese Application No. 2007-187672.

* cited by examiner

*Primary Examiner* — Pamela Rodriguez
(74) *Attorney, Agent, or Firm* — Andrew M. Calderon; Roberts Mlotkowski Safran & Cole, P.C.

(57) ABSTRACT

A control unit 20 includes an initial current value calculation unit 22 for calculating an initial current value when a caliper pressure shifts to a pressure increasing state, a target current value setting unit 23 which, when no pressure increasing cycle was performed last time, estimates a road surface friction coefficient, determines a target differential pressure based on the road surface friction coefficient so estimated, and sets a current value corresponding to this target differential pressure as a target current value, and a valve opening amount adjusting unit 25 which reduces an energization amount from the initial current value towards the target current value with a predetermined gradient.

21 Claims, 8 Drawing Sheets

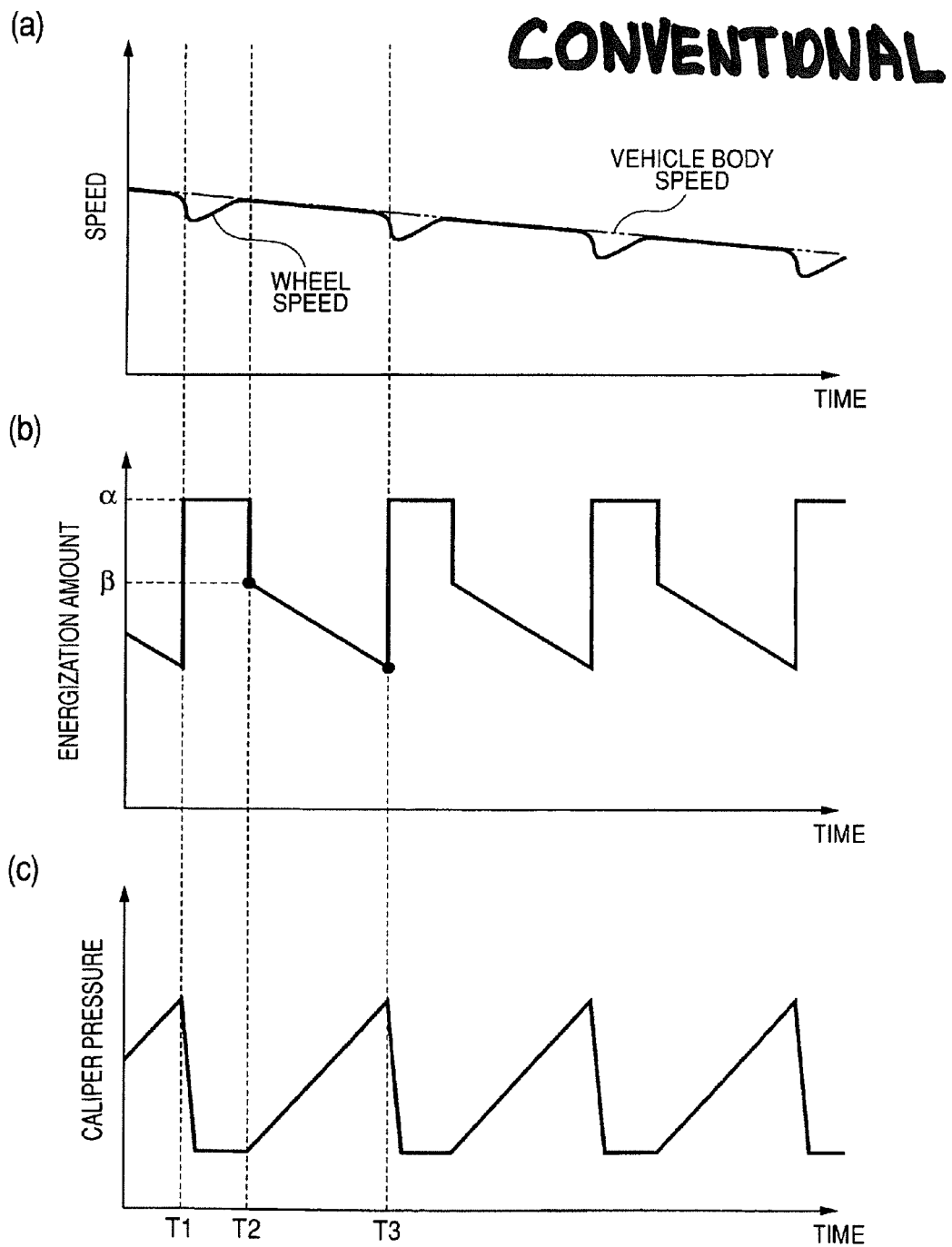

VEHICLE BRAKE HYDRAULIC PRESSURE CONTROL APPARATUS

BACKGROUND OF THE INVENTION

1. Field of the Invention

The present invention relates to a vehicle brake hydraulic pressure control apparatus which utilizes normally open linear solenoid valves as inlet valves.

2. Description of Related Art

In general, there is known a vehicle brake hydraulic pressure control apparatus which is disposed between a master cylinder generating hydraulic pressure according to a pedal effort applied by the driver and wheel brakes which apply brake forces to road wheels for controlling brake forces generated at the wheel brakes. A vehicle brake hydraulic pressure control apparatus like this includes mainly normally open inlet valves which allows transmission of the brake hydraulic pressure from the master cylinder side to the wheel brakes, normally closed outlet valves for allowing hydraulic pressures within the wheel brakes (hereinafter, also referred to as caliper pressures) to escape therefrom and reservoirs for absorbing the brake hydraulic pressures which are allowed to escape therefrom by the outlet valves being opened. In addition, in the vehicle brake hydraulic pressure control apparatus, a brake control by a so-called anti-lock brake system (hereinafter, referred to as an ABS control) is enabled in which, for example, when it is determined that one of the road wheels is likely to lock when braking (a slip ratio has reached a predetermined value or higher), the corresponding inlet valve is closed while the corresponding outlet valve is opened so as to allow the caliper pressure to escape into the reservoir to thereby prevent the lock-up of the road wheel.

As the vehicle brake hydraulic pressure control apparatus that has been described above, a vehicle brake hydraulic pressure control apparatus is conventionally known which utilizes as the inlet valves normally open linear solenoid valves whose valve opening amounts can be changed arbitrarily according to their energization amounts (refer to Japanese Patent Unexamined Publication JP-A-2003-19952).

In this technique, as shown in FIG. 8, when a slip ratio (a ratio of vehicle speed to wheel speed) has reached a predetermined value or higher (at time T1) at one of road wheels, a current resulting in a slightly high current value a is supplied to its inlet valve which is normally open, so that the inlet valve is closed at a breath, while its outlet valve is opened to reduce a caliper pressure at a wheel brake of the road wheel. Then, during this ABS control, when the slip ratio has reduced to a value lower than the predetermined value (when the road wheel has been restored from the lock state to the normal state; time T2), the outlet valve is closed, while the current supplied to the inlet valve is controlled so as to open the inlet valve by a predetermined valve opening amount. Specifically, the energization amount is reduced at a breath from the predetermined current value a which corresponds to the closed state to an initial current value β (at time T2). Thereafter, the energization amount is reduced gradually with a predetermined gradient, whereby the caliper pressure is made to increase substantially at the same time as a pressure increasing control is started (at time T2). In addition, when the slip ratio becomes equal to or higher than the predetermined value again in the course of the energization amount being reduced with the predetermined gradient (at time T3), a current of the current value .alpha. is supplied to the inlet valve so that the inlet valve is closed at a breath, whereupon the pressure increasing control ends.

Incidentally, in the current control that has been described above, when the current value is gradually reduced from the initial current value β, in the event that a target current value is determined in advance, the inclination of the gradient can be changed appropriately in accordance with, for example, a road surface friction coefficient. In addition, it is preferable that the target current value takes a current value at which the pressure increasing control ends, and in general, it is desirable to refer to a current value resulting when the last pressure increasing control of the several pressure increasing controls that had been executed during the ABS control ended.

When the current value resulting when the last pressure increasing control ended is used as the target current value as has been described above, however, since the last current value cannot be referred to in an initial pressure increasing control of the ABS control, in the initial pressure increasing control, for example, it has been necessary to perform a current control with a constant gradient with no target current value determined. In addition, when the current control is performed only with the constant gradient, since it takes time to realize an intended caliper pressure depending on a road surface condition, it has not been possible to increase further the efficiency of the brake control.

SUMMARY OF THE INVENTION

The invention has been made in view of these situations, and an object thereof is to provide a vehicle brake hydraulic pressure control apparatus which can realize a further increase in brake control efficiency by determining a target current value in an initial pressure increasing control in an ABS control to an appropriate value.

With a view to solving the problem, according to an aspect of the invention, there is provided a vehicle brake hydraulic pressure control apparatus which controls to transmit hydraulic pressure generated in a hydraulic pressure source to wheel brakes, including:

normally open linear solenoid valves which allows transmission of the hydraulic pressure from the hydraulic pressure source to the wheel brakes and whose valve opening amounts is adjusted by energization amounts thereof;

normally closed solenoid valves which allow hydraulic pressures within the wheel brakes to escape therefrom; and a control unit which controls the energization amounts of the normally open linear solenoid valves and the normally closed solenoid valves so as to switch the hydraulic pressures within the wheel brakes to a pressure increasing state, a pressure holding state or a pressure reducing state, wherein the control unit includes:
an initial current value calculation unit which calculates an initial current value to open the normally open linear solenoid valve when the hydraulic pressure is shifted from the pressure reducing state or the pressure holding state to the pressure increasing state;
a target current value setting unit which determines whether or not a pressure increasing cycle was performed last time and,
if it is determined that the pressure increasing cycle was performed, the target current value setting unit setting a target current value based on a current value resulting when a pressure increasing had been completed before the last pressure increasing cycle,
whereas, if it is determined that the pressure increasing cycle was not performed, the target current value setting unit estimating a road surface friction coefficient, determining a target differential pressure based on the road surface friction coefficient and setting a current corresponding to the target differential pressure as a target current value; and a valve opening amount adjusting unit which reduces the energization amount from the initial current value towards the target current value with a predetermined gradient.

According to the aspect of the invention, when the pressure increasing cycle was not performed last time, the target current value setting unit firstly estimates a road surface friction coefficient and determines a target differential pressure based on the road surface friction coefficient. Then, this target current value setting unit sets a current corresponding to the target differential pressure as a target current value. Consequently, since the target current value can be set to an appropriate value even in the initial pressure increasing control in the ABS control, a further increase in brake control efficiency can be realized.

In addition, the valve opening amount adjusting unit may include a primary valve opening amount adjusting unit for reducing the energization amount from the initial current value towards a crossover current value which is set higher than the target current value with a primary gradient, and a secondary valve opening amount adjusting unit for reducing the energization amount from the crossover current value towards the target current value with a secondary gradient which is less steep than the primary gradient.

According to this configuration, the primary valve opening amount adjusting unit reduces the energization amount from the initial current value towards the crossover current value with the primary gradient which is steeper than the secondary gradient. Then, after the energization amount has reached the crossover current value, the secondary valve opening amount adjusting unit reduces the energization amount from the crossover current value towards the target current value with the secondary gradient which is less steep than the primary gradient.

Because of this, the pressure in the wheel brake can quickly be increased until a current value at which the pressure increasing state is estimated to still continue, and the pressure can be kept increased for a long time with the less steep gradient until a target current value at which the pressure increasing state is estimated to end. Namely, since the high caliper pressure resulting immediately before the road wheel locks can be used for a relative long time, the brake control efficiency can be increased.

According to the aspects of the invention, since the target current value can be set to the appropriate value when performing the initial pressure increasing control in the ABS control, a further increase in brake control efficiency can be realized.

BRIEF DESCRIPTION OF THE DRAWINGS

FIG. 8 is a time chart showing a relationship between wheel speed and vehicle body speed, energization amount of the inlet valve, and caliper pressure when a conventional pressure increasing control is implemented.

DETAILED DESCRIPTION OF THE PREFERRED EMBODIMENTS

Figure 1:
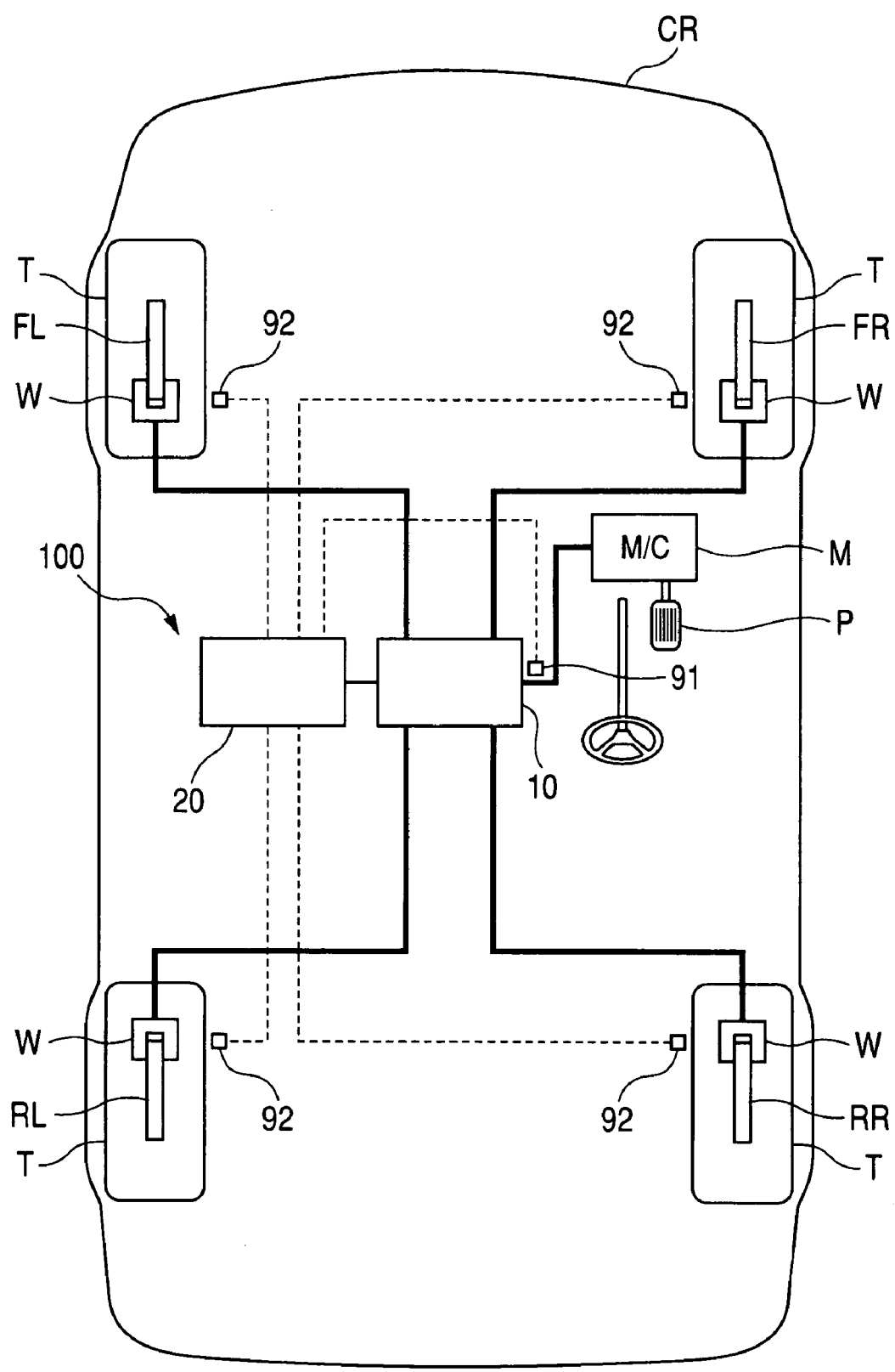
FIG. 1 is a block diagram of a vehicle provided with a vehicle brake hydraulic pressure control apparatus according to an embodiment of the invention.

Next, an embodiment of the invention will be described while referring to the drawings as required.

Figure 2:
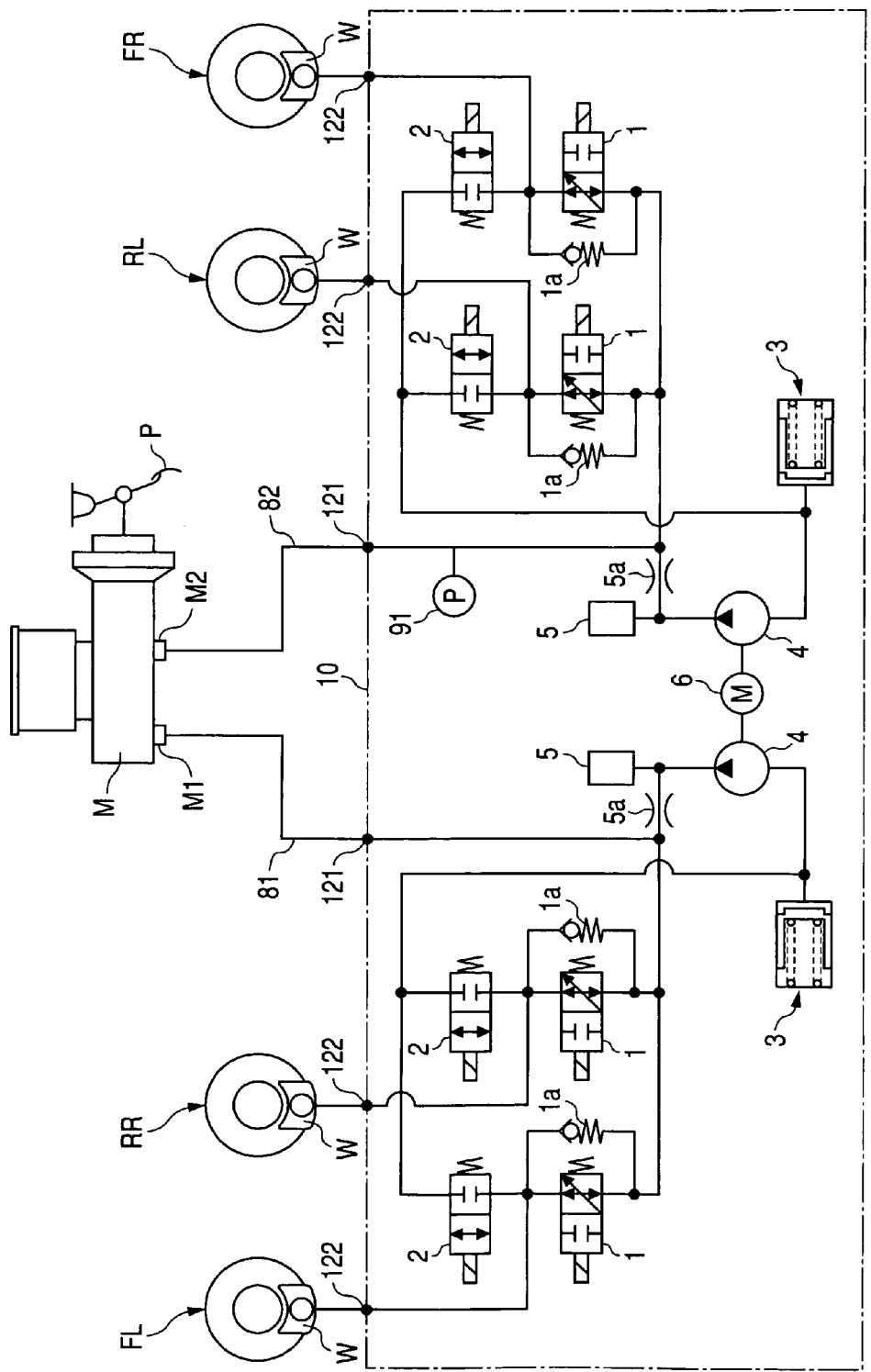
FIG. 2 is a block diagram showing the configuration of the vehicle brake hydraulic pressure control apparatus.

In the drawings to be referred to, FIG. 1 is a block diagram of a vehicle which is provided with a vehicle brake hydraulic pressure control apparatus according to an embodiment of the invention, and FIG. 2 is a block diagram showing the configuration of the vehicle brake hydraulic pressure control apparatus.

As shown in FIG. 1, a vehicle brake hydraulic pressure control apparatus 100 is a system for controlling appropriately brake forces applied to individual road wheels T of a vehicle CR. The vehicle brake hydraulic pressure control apparatus 100 includes mainly a hydraulic unit 10 in which fluid pipelines and various types of components are provided and a controller 20 for controlling appropriately the various types of components within the hydraulic unit 10.

Wheel brakes FL, RR, RL, FR are provided, respectively, in the road wheels T, and wheel cylinders W which each generate a brake force by virtue of a hydraulic pressure supplied from a master cylinder M functioning as an example of a hydraulic pressure source are provided, respectively, in the wheel brakes FL, RR, RL, FR. The master cylinder M and the wheel cylinders W are connected to the hydraulic unit 10. Then, brake hydraulic pressure generated in the master cylinder M in accordance with a pedal effort acting on a brake pedal P (a braking operation by the driver) is controlled in the controller 20 and the hydraulic unit 10 and after that, the brake hydraulic pressure is then supplied to the wheel cylinders W.

A pressure sensor 91 for detecting a hydraulic pressure in the master cylinder M and wheel speed sensors 92 for detecting respective wheel speeds of the road wheels T are connected to the controller 20. In addition, the controller 20 includes, for example, a CPU, a RAM, a ROM and input and output circuits and executes controls by implementing various types of calculating operations based on inputs from the pressure sensor 91 and the wheel speed sensors 92, as well as programs and data which are stored in the ROM. Note that the details of the controller 20 will be described later.

As shown in FIG. 2, the hydraulic unit 10 is disposed between the master cylinder M and the wheel brakes FL, RR, RL, FR. Two output ports M1, M2 of the master cylinder M are connected, respectively, to inlet ports 121 of the hydraulic unit 10 and outlet ports 122 thereof are connected, respectively, to the wheel brakes FL, RR, RL, FR. In addition, normally, fluid lines within the hydraulic unit 10 are made to communicate therethrough from the inlet ports 121 to the outlet ports 122, whereby the pedal effort on the brake pedal P is made to be transmitted to the wheel brakes FL, RR, RL, FR, respectively.

Four inlet valves 1, four outlet valves 2 and four check valves 1a are provided in the hydraulic unit 10 in such a manner as to correspond to the respective wheel brakes FL, RR, RL, FR. In addition, two reservoirs 3, two pumps 4, two dampers 5 and two orifices 5a are provided in such a manner as to correspond to respective outlet hydraulic lines 81, 82 which correspond, in turn, to the outlet ports M1, M2. The hydraulic unit 10 also includes a motor 6 for driving the two pumps 4.

The inlet valves 1 are normally open linear solenoid valves which are disposed between the respective wheel brakes FL, RR, RL, FR and the master cylinder M (upstream of the respective wheel brakes FL, RR, RL, FR). The valve opening amount of the inlet valve 1 is made to be adjusted by an energization amount from the controller 20. The inlet valve 1 is normally open so as to allow transmission of a brake hydraulic pressure from the master cylinder M to the respective wheel brakes FL, RR, RL, RR.

In addition, the inlet valve 1 cuts off the hydraulic pressure transmitted from the brake pedal P to the respective wheel brakes FL, RR, RL, FR by being closed by the controller 20 when the corresponding road wheel T is likely to lock.

Furthermore, the inlet valve 1 increases the hydraulic pressure in each of the wheel brakes FL, RR, RL, FR with a predetermined gradient by being controlled by the controller 20 in such a manner as to provide a predetermined valve closing force (a valve opening amount).

The outlet valves 2 are normally closed solenoid valves which are disposed between the respective wheel brakes FL, RR, RL, FR and the respective reservoirs 3 (on hydraulic lines each extending from a hydraulic line on a wheel cylinder W side of the inlet valve 1 to a hydraulic line reaching the reservoir 3 and the pump 4). Although the outlet valve 2 is normally closed, the outlet valve 2 causes the hydraulic pressure acting on each of the wheel brakes FL, RR, RL, FR to escape therefrom to the corresponding reservoir 3 by being opened by the controller 2 when the corresponding road wheel T is likely to lock.

The check valves 1a are connected in parallel to the inlet valves 1, respectively. These check valves 1a permit only flow of brake fluid from the respective wheel brakes FL, RR, RL, FR towards the master cylinder M and also permit the flow of brake fluid from the respective wheel brakes FL, RR, RL, FR towards the master cylinder M, even if the input from the brake pedal P is released and the inlet valves 1 are closed.

The reservoirs 3 have a function to absorb brake fluid allowed to escape by the respective outlet valves 2 being opened.

The pumps 4 have a function to take in the brake fluid which is absorbed in the reservoirs 3 so as to return the brake fluid to the master cylinder M by way of the dampers 5 and the orifices 5a. Thus, the pressurized states in the respective output hydraulic lines 81, 82 which were reduced by the brake hydraulic pressures absorbed by the reservoirs 3 are restored.

By their opening/closing states being controlled by the controller 20, the inlet valves 1 and the outlet valves 2 control hydraulic pressures in the wheel cylinders W (hereinafter, referred to as "caliper pressures") of the respective wheel brakes FL, RR, RL, FR. For example, (1) in the normal state in which the inlet valves 1 are opened and the outlet valves 2 are closed, with the brake pedal P kept depressed, a hydraulic pressure from the master cylinder M is transmitted to the wheel cylinders W as it is so that a pressure increasing state is generated within each of the wheel cylinders W;

(2) when the inlet valves 1 are closed and the outlet valves 2 are opened, the brake fluid is released from the wheel cylinder W to the reservoir 3 side to realize a pressure decreasing state; and (3) when both the inlet valves 1 and the outlet valves 2 are closed, a pressure holding state in which the caliper pressure (hydraulic pressure in the wheel cylinder W) is held is generated therein.

In addition, with the inlet valves 1 opened by a predetermined valve opening amount, a pressure increasing state in which the pressure within the wheel cylinder W is increased gradually with a predetermined gradient is generated in each of the wheel cylinders W. Further, the controller 20 outputs a predetermined amount of current or a control signal to each inlet valve 1 and each outlet valve 2 to switch the hydraulic pressure in each wheel cylinder W to the pressure increasing state, the pressure reducing state or the pressure holding state in accordance with a target brake hydraulic pressure in the wheel cylinder W.

Figure 3:
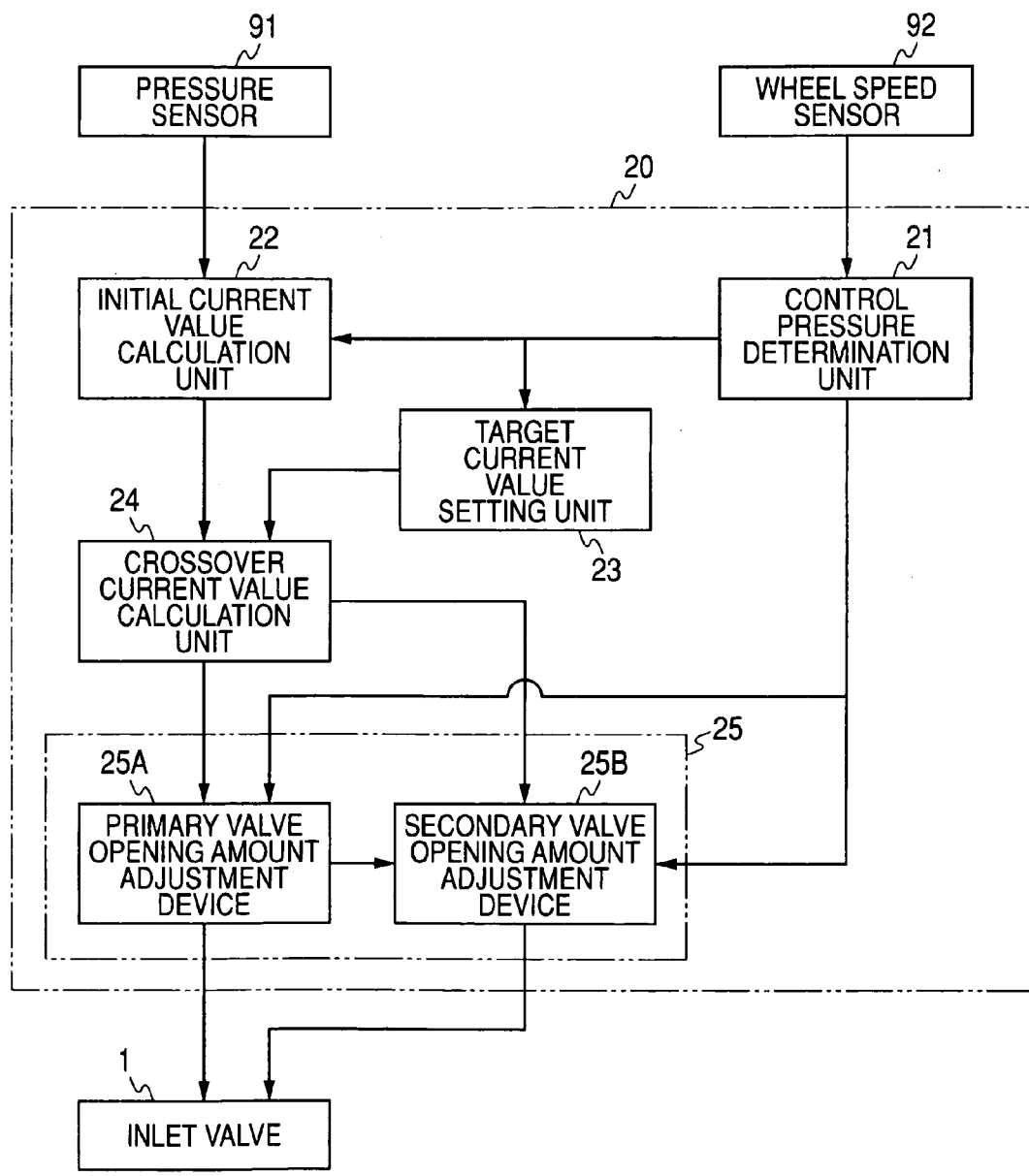
FIG. 3 is a block diagram showing the configuration of a controller.
Figure 4:
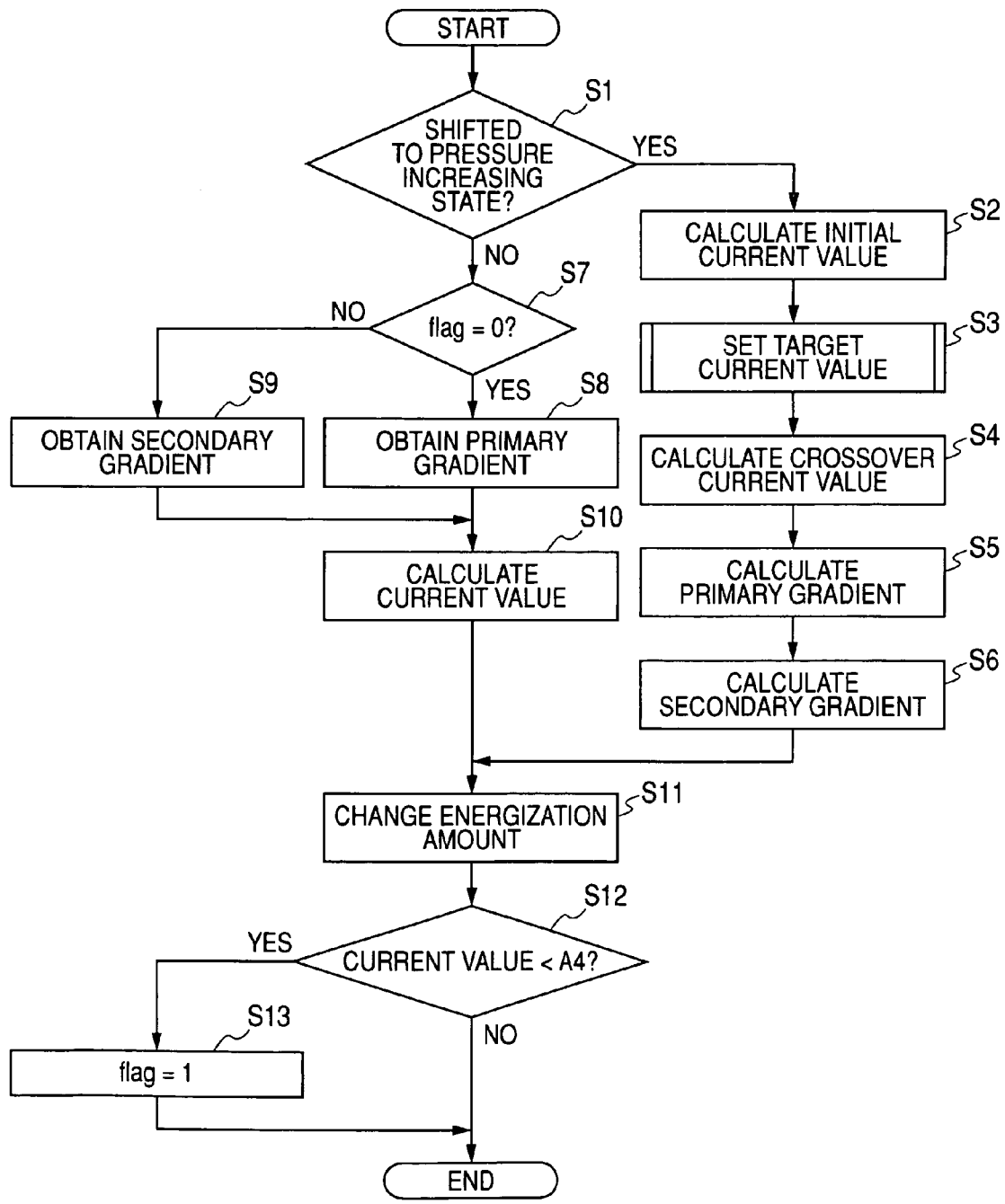
FIG. 4 is a flowchart illustrating a valve opening control carried on an inlet valve by the controller.
Figure 5:
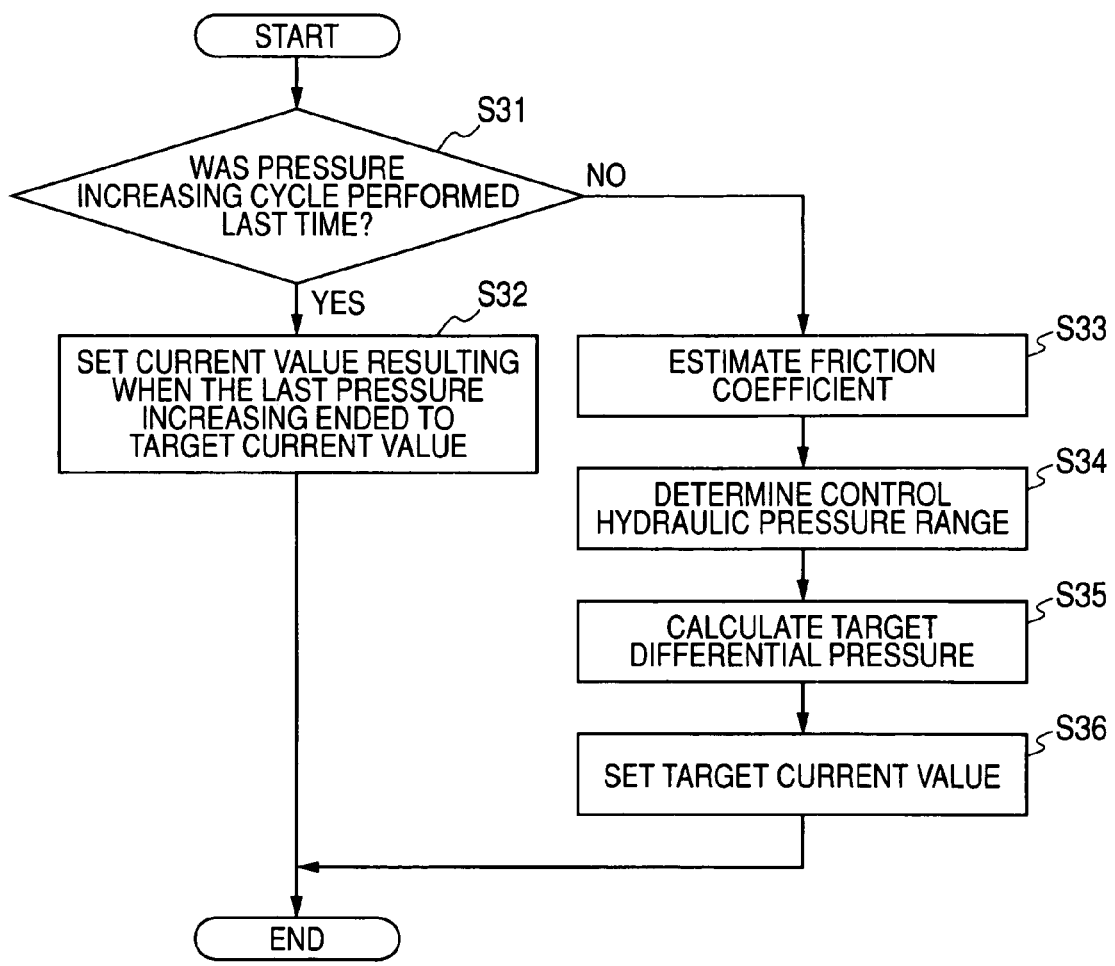
FIG. 5 is a flowchart illustrating a setting method of a target current value by the controller.
Figure 6:
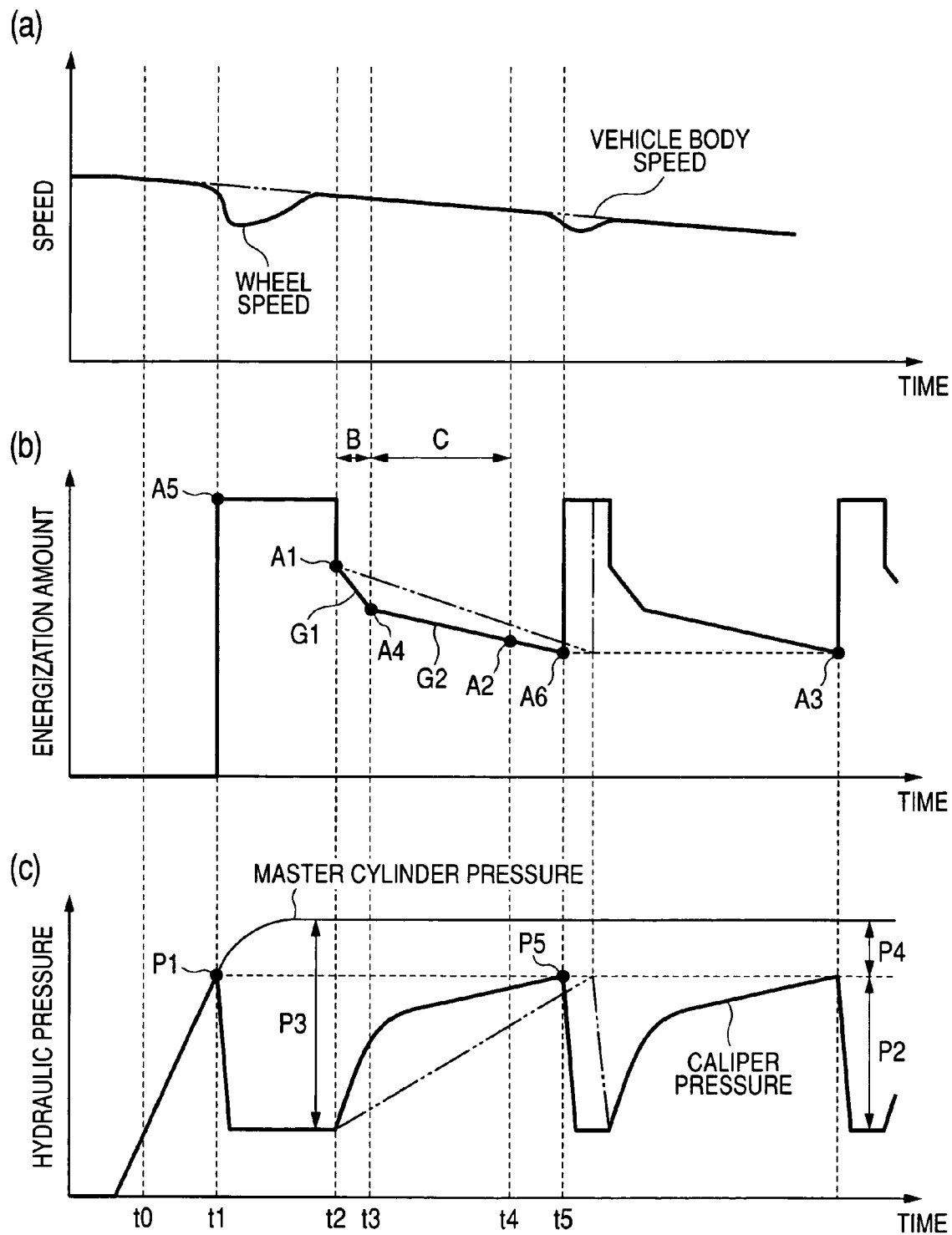
FIG. 6 is a time chart showing a relationship between wheel speed and vehicle body speed, energization amount of the inlet valve, and hydraulic pressure.

Next, the details of the controller 20 will be described. In the drawings to be referred to, FIG. 3 is a block diagram showing the configuration of the control unit, and FIG. 4 is a flowchart illustrating a valve opening control of the inlet valve by the controller. In addition, FIG. 5 is a flowchart illustrating a setting method of a target current value by the controller, and FIG. 6 is a time chart illustrating relationships between wheel speed and vehicle body speed, and an energization amount to the inlet valve and hydraulic pressure.

As shown in FIG. 3, the controller 20 is configured to include a control pressure determination unit 21, an initial current value calculation unit 22, a target current value setting unit 23, a crossover current value calculation unit 24 and a valve opening amount adjustment unit 25.

The control pressure determination unit 21 has a function to determine to set the pressure increasing state, the pressure reducing state or the pressure holding state the caliper pressure.

Specifically, for example, determining that the road wheel T is likely to lock when a speed ratio (a slip ratio) of a wheel speed detected by the wheel speed sensor 92 to vehicle body speed which is estimated based on the wheel speeds of the four road wheels T becomes a predetermined value or higher and the wheel acceleration is 0 or smaller, the control pressure determination unit 21 determines that the caliper pressure should be in the pressure reducing state. Here, the wheel acceleration is calculated from the wheel speed, for example.

In addition, the control pressure determination unit 21 determines that the caliper pressure should be in the pressure holding state when the wheel acceleration is larger than 0. Furthermore, the control pressure determination unit 21 determines that the caliper pressure should be in the pressure increasing state when the slip ratio becomes less than the predetermined value and the wheel acceleration is 0 or smaller.

Then, when determining that the caliper pressure should be in the pressure increasing state (namely, the hydraulic pressure is shifted from the pressure reducing state or the pressure holding state to the pressure increasing state), the control pressure determination unit 21 outputs a pressure increase start signal to the initial current value calculation unit 22 and the target current value setting unit 23. In addition, when determining that the caliper pressure should be in the pressure reducing state, the control pressure determination unit 21 outputs a pressure reducing start signal to the valve opening amount adjustment unit 25.

Initial current value calculation unit 22 has a function to calculate an initial current value to open the inlet valve 1 based on difference between estimated caliper pressure and master cylinder pressure detected by the pressure sensor 91 (a pressure difference between a pressure resulting upstream and a pressure resulting downstream of the inlet valve 1), when receiving the pressure increase start signal from the control pressure determination unit 21, the initial current.

Here, the "estimated caliper pressure" means a caliper pressure that is calculated by a known method, for example, a caliper pressure that is calculated (estimated) based on the master cylinder pressure detected by the pressure sensor 91 and the opening/closing state of the inlet valve 1 and the outlet valve 2.

In addition, the "initial current value to open the inlet valve 1" means, as an example, a current value at which the valve starts to open, that is, a current value at which the differential pressure between the upstream pressure and the downstream pressure of the inlet valve 1 and a force with which the valve body is pushed in an opening direction by a spring is balanced with a valve closing force that is generated in the valve body by energization to the inlet valve 1.

Note that in addition to the current value at which the valve starts to open, for example, a current value which is slightly lower or higher than the current value at which the valve starts to open may be used as the initial current value.

In addition, for calculation of this initial current value, for example, it is preferable to use a table stored in the storage such as the ROM or RAM which shows a relationship between the initial current value and the differential pressure between the upstream pressure and the downstream pressure of the inlet valve 1. In addition, when having calculated an initial current value, this initial current value calculation unit 22 outputs the initial current value so calculated to the crossover current value calculation unit 24.

The target current value setting unit 23 has a function to judge whether or not the pressure increasing cycle was performed last time, when having received the pressure increase start signal from the control pressure determination unit 21. When it judges that the pressure increasing cycle was performed, the target current value setting unit 23 sets a target current value (a current value at which the pressure increasing state is estimated to end) based on the current value resulting when the pressure increasing had ended before the last pressure increasing cycle.

Here, the judgment on whether or not the pressure increasing cycle was performed last time may only has to be made such that for example, when the target current setting unit 23 receives the pressure increase start signal, a flag is set (to "1") and the judgment is made based on the flag so set. Namely, when the flag is "0," it may be judged that the pressure increasing cycle was not performed, whereas when the flag is "1," it may be judged that the pressure increasing cycle was performed. Note that this flag may be returned to "0" at the end of the ABS control. In addition, when judging that the pressure increasing cycle was performed, as shown in FIG. 6, for example, the target current value setting unit 23 sets a current value A6 resulting when the pressure increasing in the first (last) pressure increasing cycle ended (time t5) as a target current value A3 for a second pressure increasing cycle.

In addition, the target current value setting unit 23 has a function to set a target current value based on road surface friction coefficient, control hydraulic pressure range and target differential pressure, if pressure increasing cycle was not performed last time. Specifically, firstly, as shown in FIG. 6, the target current value setting unit 23 estimates from a hydraulic pressure P1 (a master cylinder pressure) upstream of the inlet valve 1 which resulted when the last pressure reducing started (when the initial pressure reducing stated in the ABS control) using a known method a road surface friction coefficient which resulted when the last pressure reducing started. Specifically, this road surface friction coefficient estimation method makes use of the fact that the value of master cylinder pressure resulting when the initial pressure reducing started in the ABS control (when the ABS control started) changes according to the road surface friction coefficient.

Namely, as this road surface friction coefficient estimation method, a method can be adopted to estimate the road surface friction coefficient by using a table showing a relationship between the master cylinder pressure and the road surface friction coefficient. Note that the relationship such as a correlation that with a low road surface friction coefficient, a master cylinder pressure resulting when the ABS control starts becomes low, whereas with a high road surface friction coefficient, a master cylinder pressure resulting when the ABS control starts becomes high is measured in advance by experiments or the like.

Next, the target current value setting unit 23 determines a control hydraulic pressure range P2 (refer to FIG. 6) as a variation range of the caliper pressure during the ABS control based on the road surface friction coefficient. Here, the control hydraulic pressure P2 is a variation range which occurs generally when the ABS control is performed and is measured in advance through experiments or the like.

In addition, since this control hydraulic pressure range P2 is a value which changes with road surface friction coefficient, a correlation between the control hydraulic pressure range P2 and the road surface friction coefficient is also measured by experiments or the like. Then, the control hydraulic pressure range P2 can be determined using the table showing the correlation.

Lastly, the target current value setting unit 23 calculates a target differential pressure P4 by subtracting the control hydraulic pressure range P2 from a differential pressure P3 between an upstream pressure and a downstream pressure of the inlet valve 1 resulting when the pressure increasing started and sets a target current value 2A based on the target differential pressure P4 so calculated.

Specifically, the target current value A2 can be calculated by multiplying the target differential pressure P4 by a current/differential pressure conversion coefficient. Here, the current/differential pressure conversion coefficient can be obtained through experiments or the like. In addition, when having set the target current value A2, the target current value setting unit 23 outputs this target current value 2A to the crossover current value calculation unit 24.

The crossover current value calculation unit 24 has a function to calculate, when receiving the initial current value A1 outputted thereto from the initial current value calculation unit 22 and the target current value A2 outputted thereto from the target current value setting unit 23, a crossover current value A4 (a current value at which the pressure increasing state is estimated not to end or to still continue) based on these respective current values A1, A2.

Specifically speaking, this crossover current value calculation unit 24 calculates the crossover current value A4 by multiplying a value resulting from subtraction of the target current value A2 from the initial current value A1 by a predetermined rate and subtracting the value resulting from the multiplication from the initial current value A1. Then, when having calculated the crossover current value A4, the crossover current value calculation unit 24 outputs the crossover current value A4, the initial current value A1 and the target current value A2 to the valve opening amount adjustment unit 25.

To describe in detail, the crossover current value A4 and the initial current value A1 are outputted to a primary valve opening amount adjustment device 25A, which will be described later, and the crossover current value A4 and the target current value A2 are outputted to a secondary valve opening amount adjustment device 25B.

The valve opening amount adjustment unit 25 is configured to include the primary valve opening amount adjustment device 25A and the secondary valve opening amount adjustment device 25B.

The primary valve opening amount adjustment device 25A has a function to reduce, when receiving the crossover current value A4 and the initial current value A1 from the crossover current value calculation unit 24, an energization amount from a current value A5 resulting when the valve is closed towards the initial current value A1 at a breath and thereafter to reduce the energization amount from the initial current value A1 towards the crossover current value A4 with a primary gradient G1, as shown in FIG. 6.

Specifically, the primary valve opening amount adjustment device 25A calculates a primary gradient G1 in such a manner that a time taken until the energization amount reaches the crossover current value A4 from the initial current value A1 (t3-t2) becomes a primary specified time period B. Namely, the primary valve opening amount adjustment device 25A calculates a primary gradient G1 by the following expression.

Primary gradient $G1$=(crossover current value $A4$−initial current value $A1$)/primary specified time period $B$ Then, the primary valve opening amount adjustment device 25A reduces the energization amount from the initial current value A1 towards the crossover current value A4 with the primary gradient G1 so calculated. Then, when having reduced the energization amount to the crossover current value A4, the primary valve opening amount adjustment device 25A outputs an end signal to the secondary valve opening amount adjustment device 25B.

The secondary valve opening amount adjustment device 25B has a function to reduce, when receiving the crossover current value A4 and the target current value A2 from the crossover current calculation unit 24 and the end signal from the primary valve opening amount adjustment device 25A, the energization amount from the crossover current value A4 towards the target current value A2 with a secondary gradient G2 which is less steep than the primary gradient G1. Specifically, the secondary valve opening amount adjustment device 25B calculates a secondary gradient G2 in such a manner that a time taken until the energization amount reaches the target current value A2 from the crossover current value A4 (t4-t3) becomes a secondary specified time period C which is longer than the primary specified time period B. Namely, the secondary valve opening amount adjustment device 25B calculates a secondary gradient G2 by the following expression.

Secondary gradient $G2$=(target current value $A2$−crossover current value $A4$/secondary specified time period $C$ The secondary valve opening amount adjustment device 25B reduces the energization amount from the crossover current value A4 to the target current value A2 with the secondary gradient G2 so calculated. In addition, even after the energization amount has reached the target current value A2, the secondary valve opening amount adjustment device 25B continues to reduce the energization further until it receives a pressure reducing start signal from the control pressure determination unit 21.

Then, when receiving the pressure reducing start signal from the control pressure determination unit 21, this secondary control valve opening amount adjustment device 25B and the aforesaid primary valve opening amount adjustment device 25A increase the energization which is being reduced at the predetermined gradient to the current value A5 resulting when the valve is closed at a breath to thereby close the inlet valve (FIG. 6; time t5).

The controller 20 which is configured as has been described heretofore performs a valve opening control (a pressure increasing control) based on the flowchart shown in FIG. 4. Hereinafter, a valve opening control on the inlet valve 1 by the controller 21 will be described. Note that the pressure increasing control shown in FIG. 4 is started when the control pressure determination unit 21 determines that the inlet valve 1 should be in the pressure increasing state. In addition, when the control pressure determination unit 21 determines that the inlet valve 1 should be in the pressure reducing state or the pressure holding state, the controller 20 executes a known pressure reducing control or pressure holding control.

As shown in FIG. 4, the controller 20 first determines whether or not the control pressure determination unit 21 has determined that the caliper pressure should be shifted from the pressure reducing state or the pressure holding state to the pressure increasing state, that is, whether or not the caliper pressure has shifted from the pressure reducing state or the pressure holding state to the pressure increasing state (S1).

Here, as to the determination of the shift, if the last value indicating the state of the caliper pressure determined by the control pressure determination unit 21 indicates that the caliper pressure is in the pressure reducing state or the pressure holding state and the current value indicates that the caliper pressure is in the pressure increasing state, it is then determined that the caliper pressure has shifted accordingly (S1; Yes), whereas if the last value and the current value both indicate that the caliper pressure is in the pressure increasing state, it is then determined that the caliper pressure has not shifted accordingly (S1; No).

If the caliper pressure is determined to have shifted to the pressure increasing state in step S1 (Yes), the controller 20 sequentially calculates an initial current value A1 (S2) and sets a target current value A2 (or A3) (S3). In addition, if the caliper pressure is determined to have shifted to the pressure increasing state in step S1, the initial current value A1 which was calculated in the last pressure increasing control is reset and the flag, which will be described later, is returned to zero.

Here, in setting a target current value in step S3, an operation will be executed following the flowchart shown in FIG. 5. Namely, in the flowchart shown in FIG. 5, the controller 20 firstly determines whether or not the pressure increasing cycle was performed last time (S31).

If it is determined in step S31 that the pressure increasing cycle was performed last time (Yes), the controller sets a current value A6 resulting when the last pressure increasing ended as a target current value A3 (S32). In addition, if it is determined in step S31 that the pressure increasing cycle was not performed last time (No), the controller 20 sequentially estimates a road surface friction coefficient (S33), determines a control hydraulic pressure range P2 (S34) and calculates a target differential pressure P4 (S35). Thereafter, the controller 20 sets a target current value A2 based on the target differential pressure P4. Then, after steps S36 and S32, the controller ends the operation which follows this flow and returns to the flow shown in FIG. 4.

As shown in FIG. 4, having set the target current value (S3), the controller 20 sequentially calculates a crossover current value A4 (S4), calculates a primary gradient G1 (S5) and calculates a secondary gradient G2 (S6).

Thereafter, the controller 20 changes the energization amount of the inlet valve 1 to the initial current value A1 (S11) and determines whether or not the present current value is less than the crossover current value A4 (S12). If it is determined in step S12 that the present current value has become less than the crossover current value A4 (Yes), the controller 20 sets the flag to "1" (S13) and returns to the operation in step S1.

If it is determined in step S1 that the caliper pressure has not shifted to the pressure increasing state, that is, determined that the caliper pressure still stays in the pressure reducing state or holding state (No), the controller 20 then determines whether or not the flag is "0" (S7).

If it is determined in step S7 that the flag is "0" (Yes), since the present current value is not less than the crossover current value A4, the controller 20 obtains a primary gradient G1 and calculates the next current value (a current value which is reduced from the present current value along the primary gradient G1) based on the primary gradient G1 so obtained and the present current value (S10). Thereafter, in step S11, the controller 20 changes the energization amount of the inlet valve 1 to the next current value calculated in step S10. Then, by repeating the flow of operations of step S12; No→step S1; No→step S7; Yes→step S8→step S10→step S11→ . . . , the energization amount of the inlet valve 1 reduces along the primary gradient G1.

When the energization amount of the inlet valve 1 is reducing along the primary gradient G1 and its current value has become less than the crossover current value A4, the controller 20 determines that the determination in step S12 is positive or Yes and changes the flag to "1" (S13). When the flag is changed to "1" in this way, the controller 20 determines that the determination in step S1 is negative or No and thereafter determines that the determination in step S7 is negative or No, whereby the controller obtains a secondary gradient G2 in step S9 and calculates the next current value based on the secondary gradient G2 in step S10. Then, by repeating the flow of operations of step S11→S12; Yes→step S13→step S1; No→4 step S7; No→step S9→step S10→ . . . , the energization amount of the inlet valve 1 reduces along the secondary gradient G2.

Next, a series of operations of the controller 20 will be described by reference to FIG. 6.

As shown in FIG. 6, in the normal state in which the ABS control is not executed, that is, in such a state that the inlet valve 1 is open, while the outlet valve 2 is closed (for example at time t0), when a braking operation is performed by the driver, the master cylinder pressure increases gradually together with the caliper pressure. Then, when the slip ratio (the ratio of the wheel speed to the vehicle body speed) of the road wheel T reaches or exceeds the predetermined value at time t1 while the master cylinder pressure and the caliper pressure are increasing, the controller 20 starts the ABS control. Namely, the controller 20 increases the energization amount of the inlet valve at time t1 to the current value A5 at a breath so as to close the inlet valve 1.

In addition, the controller 20 outputs a predetermined pulse to the outlet valve 2 in association with the closure of the inlet valve 1 so as to open the outlet valve 2. By this action, the brake force exerted on the road wheel T is reduced, so as to prevent the road wheel T from locking.

The wheel speed of the road wheel T which has been prevented from locking then increases gradually as a result of contact with the road surface, and the wheel speed and the vehicle body speed gradually come to coincide with each other (the slip ratio comes to approach the predetermined value). Then, after the slip ratio becomes less than the predetermined value, the controller 20 enters a first pressure increasing control at a predetermined timing (time t2), so as to reduce the energization amount of the inlet valve 1 to the initial current value A1 at a breath. Note that in the above described first pressure increasing control, the controller 20 executes the current control using the target current value A2 which has been set based on the target differential pressure P4.

The controller 20 reduces the energization amount from the initial current value A1 to the crossover current value A4 with the primary gradient G1 which is steeper than the second gradient G2. In addition, when the energization amount has reached the crossover current value A4 (time t3), the controller 20 reduces the energization amount from the crossover current value A4 towards the target current value A2 with the second gradient G2 which is less steep than the primary gradient G1. Thereafter, when determining at time t5 that the slip ratio has reached or exceeded the predetermined value, the controller 20 increases the energization amount of the inlet valve 1 to the current value A5 at a breath so as to close the inlet valve 1.

Then, by the controller 20 controlling the energization amount in the way described above, the caliper pressure is increased quickly to on the order of a high pressure at which the locking of the road wheel T does not occur between time t2 to time t3. Thereafter, the caliper pressure is held at the high pressure (or is made to increase moderately) until the road wheel T is likely to lock. Then, in the pressure increasing control on and after time t5, the controller 20 executes the current control using the current value resulting when the last pressure increasing ended as the target current value in the way described above. Namely, for example, as shown in the figure, the current value A6 resulting when the first pressure increasing ended is set as a target current value 3 for a second pressure increasing control.

Here, chain double-dashed lines indicating graphs of energization amount and hydraulic pressure in FIG. 6 represent the energization control and caliper pressure in a form in which a target value for a first pressure increasing control is not determined. In the form in which the target value for the first pressure increasing control is not determined, since there occurs a situation in which an energization amount at which the road wheel T is likely to lock (the pressure reducing control is initiated) is unknown, in order that the pressure reducing control is not initiated immediately after the pressure increasing has ended on a road surface having a low friction coefficient, there is no other way than reducing the energization amount with the constant moderate gradient as shown in the figure. In contrast to this, as with the embodiment of the invention, in the event that the target current value A2 for the first pressure increasing control is determined based on the target differential pressure P4, since the gradient can be changed in the two stages from the first pressure increasing control, a good brake control can be enabled.

Thus, according to the configurations that have been described heretofore, the following advantages can be provided in this embodiment.

Since the target current value setting unit 23 sets the target current value 2A to the appropriate value based on the target differential pressure P4 when the initial pressure increasing control is carried out in the ABS control, a further increase in brake control efficiency can be realized.

Since the energization amount is reduced from the initial current value A1 towards the crossover current value A4 with the primary gradient G1 and the energization amount is further reduced from the crossover current value A4 towards the target current value A1 with the secondary gradient G2 which is less steep than the primary gradient G1, the high caliper pressure resulting immediately before the road wheel T locks can be made use of for the relatively long time period, thereby making it possible to increase the brake control efficiency.

Since the reduction in energization amount continues by the second valve opening amount adjustment device 25B even after the energization amount has reached the target current value A3, even though there exists the effect of disturbance such as, for example, a change in the braking operation by the driver or a change in the road surface condition, the pressure increasing control can be performed in a stable fashion.

Since the time period during which the energization amount is reduced with the first gradient G1 is made to be the primary specified time period B which is shorter than the secondary specified time period C, the energization amount can be increased quickly to the crossover current value A4, thereby making it possible to suppress the occurrence of a delay in increasing the caliper pressure. Furthermore, since the time period during which the energization amount is reduced with the less steep secondary gradient G2 is made to be the secondary specified time period C which is longer than the primary specified time period B, the high caliper pressure resulting immediately before the road wheel T locks can be made use of for the relatively long time period.

Since the target current value A3 is set based on the current value A6 resulting when the pressure increasing in the last pressure increasing cycle ended, the target current value A3 can be set with higher accuracy, thereby making it possible to realize an increase in brake control in a more ensured fashion.

Since the crossover current value A4 is calculated by multiplying the value resulting from subtraction of the target current value A3 from the initial current value A1 by the predetermined rate, the crossover current value A4 can be set between the initial current value A1 and the target current value A3 in an ensured fashion.

Note that the invention is not limited to the embodiment that has been described heretofore and hence can be applied to various forms which will be illustrated hereinafter.

In the embodiment, while the valve opening amount adjusting device 25 is adopted which reduces the energization amount with the two types of gradients G1, G2 by setting the crossover current value A4, the invention is not limited thereto. For example, a valve opening amount adjusting device may be adopted which reduces the energization amount from the initial current value towards the target current value with a constant gradient. Even if this occurs, since the inclination of the gradient can be changed to an appropriate inclination by determining a target current value for the first pressure increasing cycle, a further increase in brake control can be realized.

In the embodiment, while the crossover current value A4 and the target current value A3 are modified as required by the controller 20, the invention is not limited thereto, and hence, for example, fixed values may be used which are determined in advance through experiments or simulations. In addition, other methods may be used to calculate the crossover current value A4, and hence, for example, the crossover current value may be calculated by adding simply a predetermined value (a predetermined value which is lower than a difference between the initial current value and the target current value A3) set in advance to the target current value A3.

In the embodiment, while the current value A6 resulting when the pressure increasing in the last pressure increasing cycle ended is adopted as the target current value A3, the invention is not limited thereto. For example, an average value between the current value resulting when the pressure increasing in the last pressure increasing cycle ended and the last target current value may be used as the target current value. In addition, for example, an average value of current values resulting when the pressure increasing in the last two or more pressure increasing cycles ended may be used as the target current value.

In the embodiment, while the energization amount is made to continue to reduce even after the energization amount has reached the target current value A3 as long as the road wheel T comes into a state in which the road wheel T is likely to lock, the invention is not limited thereto, and hence, when the target current value has been reached, the inlet valve may be closed to end the pressure increasing.

Figure 7:
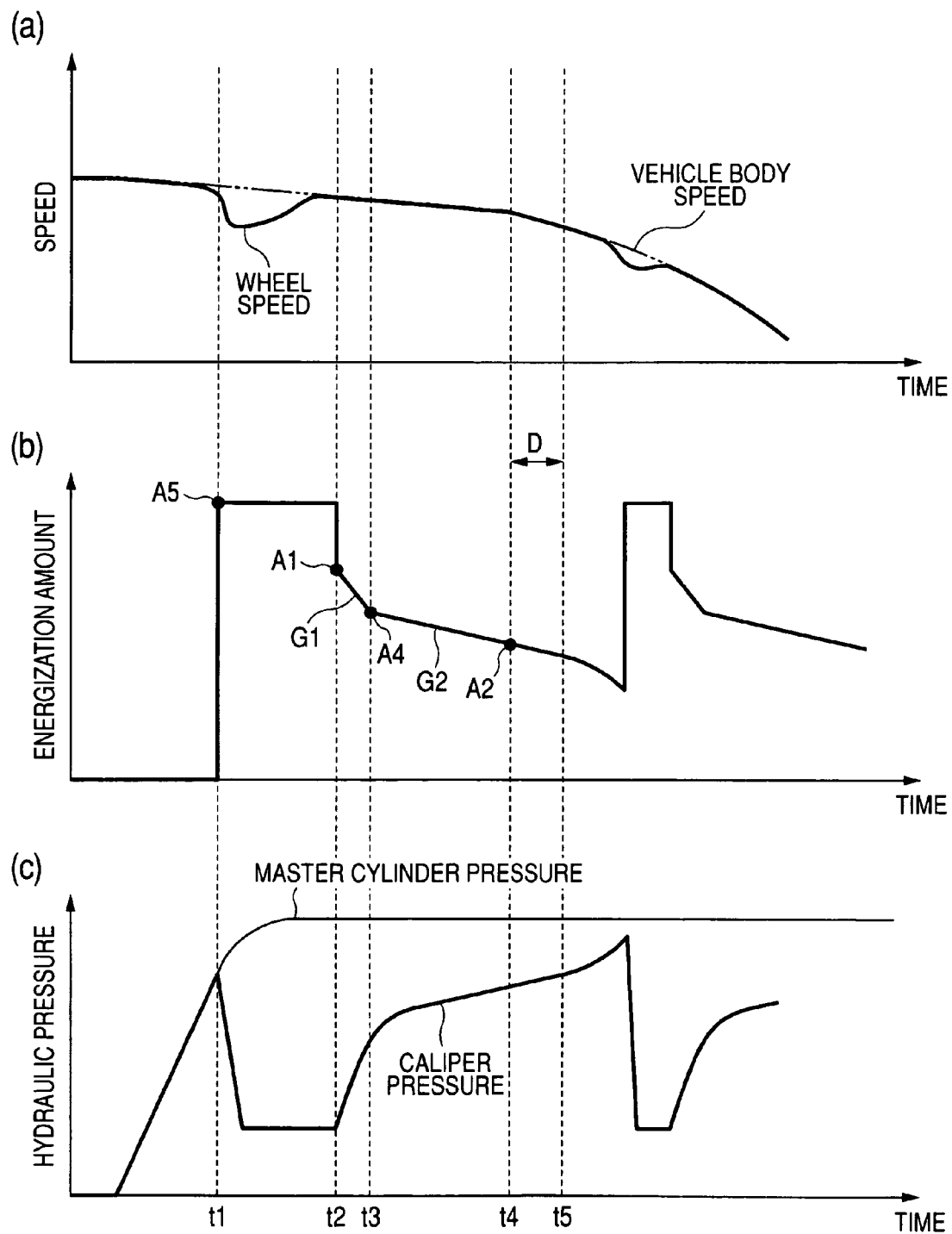
FIG. 7 is a time chart showing a form in which a gradient after a target current value has been surpassed is made steep.

In the embodiment, while the gradient resulting after the energization amount has surpassed the target current value A3 is made to be the gradient equal to the secondary gradient G2, the invention is not limited thereto. For example, as shown in FIG. 7, it is determined whether or not a predetermined time period D has elapsed since the energization amount reached the target current value A3, and if it is determined that the predetermined period time D has elapsed, determining that the road wheel T has shifted to a road surface having a high friction coefficient (a high μ road), the gradient may be inclined steeper than the secondary gradient G2.

In addition, when it is confirmed using a known road surface friction coefficient (road surface μ) determination function that the road surface μ has reached or exceeded a predetermined value, determining that the road wheel T has shifted to the high μ road, the gradient may be changed to a steep gradient. According to what has been described heretofore, when the road wheel T has shifted to the high μ road, a higher brake force can be obtained.

In the embodiment, while the primary gradient G1 is fixed to the predetermined value, the invention is not limited thereto, and hence, for example, the primary gradient G1 may be changed according to the road surface μ. Namely, when it is confirmed using the known road surface friction coefficient determination function that the road surface μ is getting lower, the inclination of the primary gradient G1 may be made less steep accordingly. According to this, the increasing acceleration of the caliper pressure to the crossover current value can be changed according to the road surface μ. Because of this, for example, the caliper pressure can quickly be increased so as to increase quickly the brake force on a high μ road, while on a low μ road, the caliper pressure is increased moderately so as to suppress the occurrence of wheel locking.

In this embodiment, while the initial current value is calculated from the pressure difference between the upstream pressure and the downstream pressure of the inlet valve 1, the invention is not limited thereto. For example, as with the JP-A-2003-19952, the inlet valve 1 is opened gradually with the predetermined gradient in the first pressure increasing control, and the energization amount of electricity supplied to energize the inlet valve 1 is stored at a point in time at which the caliper pressure is actually increased (at a point in time at which the inlet valve 1 is opened), so that the energization amount so stored may be used as the initial current value for a second pressure increasing control and onward.

In the embodiment, while the estimated caliper pressure estimated from the master cylinder is used as the caliper, the invention is not limited thereto, and hence, pressure sensors are provided, respectively, for the wheel cylinders, so that values detected by the respective pressure sensors may be used as a caliper pressure.

In the embodiment, while the road surface friction coefficient is estimated from the master cylinder, the invention is not limited thereto, and hence, for example, the road surface friction coefficient may be estimated based on the vehicle body acceleration detected by an acceleration sensor.

In the embodiment, while the target current value A2 is set based on the target differential pressure P4 which is obtained by implementing sequentially estimation of the road surface friction coefficient (S33), determination of the control hydraulic pressure range P2 (S34) and calculation of the target differential pressure P4 (S35), the invention is not limited thereto.

For example, a table may be prepared through tests carried out on an actual brake system which shows a relationship between road surface friction coefficient resulting when the ABS control starts and target hydraulic pressure P5 resulting when the initial pressure increasing control in the ABS control ends, so that the target hydraulic pressure P5 is determined from the road surface friction coefficient using the table so prepared.

In addition, after the target hydraulic pressure P5 has been determined in the way described above, a difference (the target differential pressure P4) between the master cylinder pressure and the target hydraulic pressure P5 only has to be calculated, so as to set the target current value A2 in a similar manner to that used in the embodiment above.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A vehicle brake hydraulic pressure control apparatus which controls to transmit hydraulic pressure generated in a hydraulic pressure source to wheel brakes, comprising:

normally open linear solenoid valves which allows transmission of the hydraulic pressure from the hydraulic pressure source to the wheel brakes and whose valve opening amounts is adjusted by energization amounts thereof;

normally closed solenoid valves which allow hydraulic pressures within the wheel brakes to escape therefrom; and a control unit which controls the energization amounts of the normally open linear solenoid valves and the normally closed solenoid valves so as to switch the hydraulic pressures within the wheel brakes to a pressure increasing state, a pressure holding state or a pressure reducing state, wherein the control unit comprises:

an initial current value calculation unit which calculates an initial current value to open the normally open linear solenoid valves when the hydraulic pressure is shifted from the pressure reducing state or the pressure holding state to the pressure increasing state;

a target current value setting unit which determines whether or not a pressure increasing cycle was performed last time and, if it is determined that the pressure increasing cycle was performed, the target current value setting unit setting a target current value based on a current value resulting when a pressure increasing had been completed before the last pressure increasing cycle, whereas, if it is determined that the pressure increasing cycle was not performed, the target current value setting unit:

estimates a road surface friction coefficient, determines a control hydraulic pressure range based on the road surface friction coefficient, determines a target differential when a pressure increasing state ends by subtracting the control hydraulic pressure range from a differential pressure between an upstream pressure and a downstream pressure of the normally open linear solenoid valves resulting when the pressure increasing started, and sets a current corresponding to the target differential pressure as the target current value; and a valve opening amount adjusting unit which reduces the energization amount from the initial current value towards the target current value with a predetermined gradient.

2. The vehicle brake hydraulic pressure control apparatus as set forth in claim 1, wherein the valve opening amount adjusting unit comprises:

a primary valve opening amount adjusting unit which reduces the energization amount from the initial current value towards a crossover current value which is set higher than the target current value with a primary gradient; and a secondary valve opening amount adjusting unit for reducing the energization amount from the crossover current value towards the target current value with a secondary gradient which is less steep than the primary gradient.

3. The vehicle brake hydraulic pressure control apparatus as set forth in claim 2, wherein the crossover current value is a current value at which the pressure increasing state is estimated not to end or to still continue based on the initial current value and the target current value.

4. The vehicle brake hydraulic pressure control apparatus as set forth in claim 2, wherein the crossover current value is calculated by adding a predetermined value which is lower than a difference between the initial current value and the target current value set in advance to the target current value.

5. The vehicle brake hydraulic pressure control apparatus as set forth in claim 1, wherein the target current value is a current value at which the pressure increasing state is estimated to end.

6. The vehicle brake hydraulic pressure control apparatus as set forth in claim 1, wherein the control unit further comprises a control pressure determination unit which determines:

caliper pressure should be in the pressure reducing state by determining that a road wheel is likely to lock when a slip ratio of a wheel speed detected by a wheel speed sensor to vehicle body speed, which is estimated based on wheel speeds of all wheels, becomes a predetermined value or higher and a wheel acceleration is 0 or smaller;

the caliper pressure should be in the pressure holding state when the wheel acceleration is larger than 0; and the caliper pressure should be in the pressure increasing state when the slip ratio becomes less than the predetermined value and the wheel acceleration is 0 or smaller.

7. The vehicle brake hydraulic pressure control apparatus as set forth in claim 6, wherein:

when determining that the caliper pressure should be in the pressure increasing state, the control pressure determination unit outputs a pressure increase start signal to the initial current value calculation unit and the target current value setting unit; and when determining the caliper pressure should be in the pressure reducing state, the control pressure determination unit outputs a pressure reducing start signal to the valve opening amount adjustment unit.

8. The vehicle brake hydraulic pressure control apparatus as set forth in claim 1, wherein the initial current value calculation unit calculates the initial current value to open the normally open linear solenoid valves based on a difference between estimated caliper pressure and master cylinder pressure detected by a pressure sensor.

9. The vehicle brake hydraulic pressure control apparatus as set forth in claim 8, wherein the estimated caliper pressure is a caliper pressure that is calculated based on the master cylinder pressure detected by the pressure sensor and an opening/closing state of the normally open linear solenoid valves and the normally closed solenoid valves.

10. The vehicle brake hydraulic pressure control apparatus as set forth in claim 1, wherein the initial current value to open the normally open linear solenoid valves is a current value at which differential pressure between upstream pressure and downstream pressure of the normally open linear solenoid valves and a force with which a valve body of the normally open linear solenoid valves is pushed in an opening direction by a spring is balanced with a valve closing force that is generated in the valve body by energization to the normally open linear solenoid valves.

11. The vehicle brake hydraulic pressure control apparatus as set forth in claim 1, wherein when the target current setting unit receives a pressure increase start signal, a flag is set such that the flag is "0" when the pressure increasing cycle was not performed, and the flag is "1" when the pressure increasing cycle was performed, wherein the flag is returned to "0" at the end of antilock braking system (ABS) control.

12. The vehicle brake hydraulic pressure control apparatus as set forth in claim 1, wherein when the pressure increasing cycle was performed, the target current value setting unit sets a current value resulting when the pressure increasing a first pressure increasing cycle ended as the target current value for a second pressure increasing cycle.

13. The vehicle brake hydraulic pressure control apparatus as set forth in claim 1, wherein the target current value setting unit sets the target current value based on road surface friction coefficient, control hydraulic pressure range and target differential pressure, if the pressure increasing cycle was not performed last time.

14. The vehicle brake hydraulic pressure control apparatus as set forth in claim 13, wherein the target current value setting unit:
  estimates from a master cylinder pressure upstream of the normally open linear solenoid valves which resulted when a last pressure reducing occurred;
  determines a control hydraulic pressure range as a variation range of caliper pressure during ABS control based on the road surface friction coefficient, wherein the control hydraulic pressure is a variation range which occurs when the ABS control is performed and is measured in advance; and
  calculates a target differential pressure by subtracting a control hydraulic pressure range from a differential pressure between an upstream pressure and a downstream pressure of the normally open linear solenoid valves resulting when the pressure increasing started and sets the target current value based on the calculated target differential pressure.

15. The vehicle brake hydraulic pressure control apparatus as set forth in claim 14, wherein the target current value is calculated by multiplying the target differential pressure by a current/differential pressure conversion coefficient, and the target current value setting unit outputs the target current value to a crossover current value calculation unit.

16. The vehicle brake hydraulic pressure control apparatus as set forth in claim 15, wherein the crossover current value calculation unit calculates, when receiving the initial current value outputted from the initial current value calculation unit and the target current value outputted from the target current value setting unit, a crossover current value.

17. The vehicle brake hydraulic pressure control apparatus as set forth in claim 16, wherein the crossover current value calculation unit calculates the crossover current value by multiplying a value resulting from subtraction of the target current value from the initial current value by a predetermined rate and subtracting the value resulting from the multiplication from the initial current value, wherein the crossover current value calculation unit outputs the crossover current value, the initial current value and the target current value to the valve opening amount adjustment unit.

18. The vehicle brake hydraulic pressure control apparatus as set forth in claim 1, wherein the valve opening amount adjustment unit includes a primary valve opening amount adjustment device and a secondary valve opening amount adjustment device, wherein the primary valve opening amount adjustment device:
  reduces, when receiving a crossover current value and the initial current value from a crossover current value calculation unit, an energization amount from a current value resulting when the normally open linear solenoid valves are closed towards the initial current value and thereafter to reduce the energization amount from the initial current value towards the crossover current value with a primary gradient;
  calculates the primary gradient by:

Primary gradient=(crossover current value−initial current value)/primary specified time period, reduces the energization amount from the initial current value towards the crossover current value with the primary gradient G1 so calculated; and
  when having reduced the energization amount to the crossover current value, the primary valve opening amount adjustment device outputs an end signal to the secondary valve opening amount adjustment device.

19. The vehicle brake hydraulic pressure control apparatus as set forth in claim 18, wherein the primary gradient is changed according to the road surface μ such that the inclination of the primary gradient may be made less steep accordingly and the increasing acceleration of the caliper pressure to the crossover current value can be changed according to the road surface μ.

20. The vehicle brake hydraulic pressure control apparatus as set forth in claim 18, wherein the secondary valve opening amount adjustment device:
  reduces, when receiving the crossover current value and the target current value from the crossover current calculation unit and the end signal from the primary valve opening amount adjustment device, the energization amount from the crossover current value towards the target current value with a secondary gradient which is less steep than the primary gradient;
  calculates the secondary gradient in such a manner that a time taken until the energization amount reaches the target current value from the crossover current value becomes a secondary specified time period which is longer than the primary specified time period;
  calculates the secondary gradient by:

Secondary gradient=(target current value−crossover current value/secondary specified time period, reduces the energization amount from the crossover current value to the target current value with the secondary gradient so calculated, and even after the energization amount has reached the target current value, the secondary valve opening amount adjustment device continues to reduce the energization further until it receives a pressure reducing start signal from the control pressure determination unit; and when receiving the pressure reducing start signal from the control pressure determination unit, wherein, the secondary control valve opening amount adjustment device and the primary valve opening amount adjustment device increase the energization which is being reduced at the predetermined gradient to the current value resulting when the normally open linear solenoid valves are closed to thereby close an inlet valve.

21. The vehicle brake hydraulic pressure control apparatus as set forth in claim 1, wherein the valve opening amount adjusting unit reduces the energization amount from the initial current value towards the target current value with a constant gradient.

* * * * *